May 5, 1959   C. E. TAGGART   2,885,547
PULSE TRAIN GENERATOR WITH VARIABLE PULSE LENGTH
Filed June 16, 1953
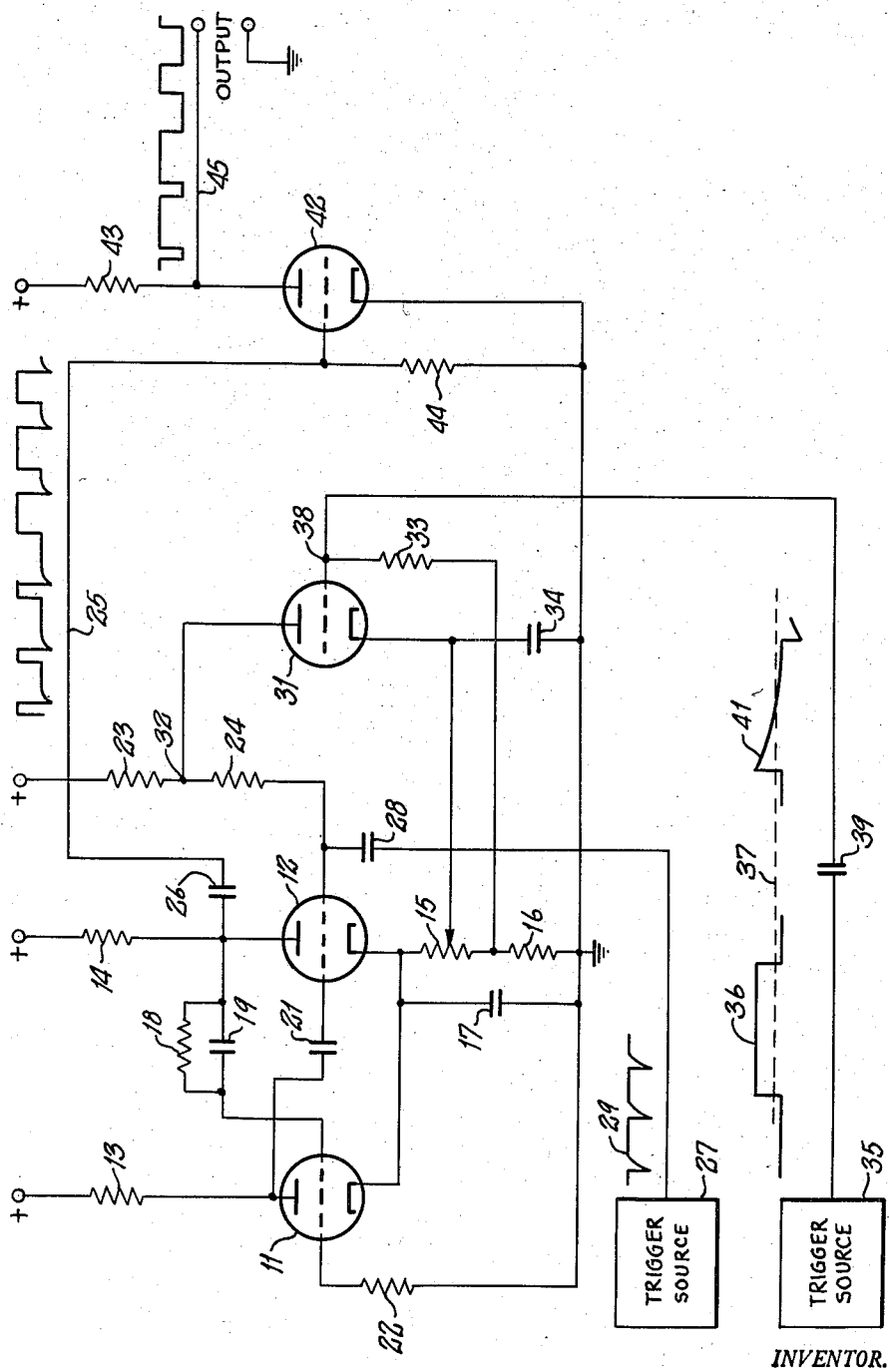
INVENTOR.
CHARLES E. TAGGART
BY
ATTORNEY

2,885,547

PULSE TRAIN GENERATOR WITH VARIABLE PULSE LENGTH

Charles E. Taggart, Mount Kisco, N.Y., assignor to General Precision Laboratory Incorporated, a corporation of New York Application June 16, 1953, Serial No. 362,081

8 Claims. (Cl. 250—27)

This invention relates generally to a pulse generating circuit and more particularly to a circuit for generating groups of pulses, the pulses of each group being of unequal width.

In the camera chain of a television transmitting system it is often necessary to generate a series of equally spaced pulses, certain of which are narrow and certain of which are wide. Heretofore apparatus for generating these pulses has been complex and expensive.

Accordingly, it is an object of this invention to provide a simple apparatus for generating a train of pulses consisting of two groups, the pulses in one group being wider than the pulses of the other group, the leading edges of all of the pulses being equally spaced.

A preferred embodiment of the invention comprises a conventional monostable multivibrator in which the grid of the normally conductive tube is returned to a source of positive potential through two serially connected resistors. The normally conductive tube is rendered nonconductive periodically by a series of equally spaced negative trigger pulses obtained from an external source. This arrangement will produce a series of equally spaced pulses of equal width on the anode of the normally conductive tube. To lengthen certain of these pulses, an auxiliary tube is provided whose anode is connected to the junction of the previously mentioned resistors. This auxiliary tube is normally biased to cutoff and while in this state has no effect on the operation of the multivibrator. An external source of positive voltage pulses renders this tube conductive periodically. While this tube is conductive, the potential of the grid return of the normally conductive tube of the multivibrator is reduced, thus increasing the length of each pulse.

For a more complete understanding of the invention, reference may be made to the accompanying drawing, the single figure of which is a schematic diagram of a preferred embodiment of the invention.

Referring now to the drawings, there is shown a multivibrator comprising two electronic tubes 11 and 12 which may, if desired, comprise two sections of a dual triode. The anodes of these tubes are connected to a source of positive potential through resistors 13 and 14 respectively. The cathodes are connected together and returned to ground through serially connected resistors 15 and 16 which are by-passed by a capacitor 17. The anode of tube 12 is coupled to the grid of tube 11 through the parallel combination of resistor 18 and capacitor 19 while the anode of tube 11 is coupled to the grid of tube 12 by a capacitor 21. The grid of tube 11 is returned to ground through a resistor 22 while the grid of tube 12 is connected to a source of positive potential through the serially connected resistors 23 and 24. An output conductor 25 is coupled to the anode of tube 12 through a capacitor 26. A source of negative trigger pulses 27 is coupled to the grid of tube 12 through a capacitor 28.

The apparatus so far described comprises a conventional monostable multivibrator in which tube 12 is normally conductive. While tube 12 is conductive, the capacitor 21 is charged substantially to the potential of the anode supply of tube 11. Each negative trigger pulse 29 from source 27 cuts off tube 12 thereby increasing its anode potential, which increase is passed to the grid of tube 11 through capacitor 19 thereby causing tube 11 to conduct and decreasing its anode potential. This decrease in anode potential is coupled to the grid of tube 12 through capacitor 21 thereby maintaining tube 12 non-conductive. The capacitor 21 then starts to discharge through tube 11 aided by the positive potential to which the grid of tube 12 is connected. When capacitor 21 has discharged sufficiently, the multivibrator will return to its normal state. During each period of non-conduction of tube 12, a positive voltage pulse will be produced on the output conductor 25.

In order to lengthen certain pulses, an auxiliary electron tube 31 is provided which receives its anode voltage from the junction 32 of the serially connected resistors 23 and 24. The grid of tube 31 is connected through a resistor 33 to the junction of resistors 15 and 16 while the cathode of this tube is connected to an intermediate adjustable point on resistor 15. The cathode is by-passed to ground by a capacitor 34. The above described grid and cathode returns render tube 31 normally nonconductive and while in this state it has no effect upon the multivibrator. An external source 35 produces a series of substantially rectangular positive voltage pulses, indicated by the waveform 36, and may be coupled directly to the grid of tube 31. The dashed line 37 represents the potential of the point 38 above which tube 31 will be conductive. The tube 31 will therefore be conductive for the duration of each pulse 36 and when conductive will reduce the potential of the point 32. When tube 12 is rendered nonconductive by a negative trigger pulse 29, the capacitor 21 will start to discharge as before, but its discharge will be slower since the potential aiding its discharge has been reduced. Tube 12 will therefore remain nonconductive for a longer period of time, thereby increasing the length of each pulse appearing on conductor 25.

If the duration of the positive pulse 36 is longer than desired, trigger source 35 may be coupled to the grid of tube 31 through a capacitor 39. Capacitor 39 and resistor 33 act as a differentiating circuit, thereby applying a potential indicated by the waveform 41 to point 38. The effect of this differentiating circuit is merely to reduce the length of time during which tube 31 is conductive and therefore decrease the number of wide pulses in each group.

The width of each pulse in the group of wide pulses is determined by the potential of the grid of tube 12 during periods of conduction of tube 31. This potential is, in turn, controlled by the conductivity of tube 31. This conductivity, and therefore the width of the pulses, can be adjusted by means of the slider on resistor 15.

The pulses appearing on conductor 25 while tube 12 is cut off have small negative-going portions, or "tails" at their trailing edges. If desired, a second auxiliary tube 42 may be provided to invert the pulses and remove the "tails." The anode of tube 42 is connected to a source of positive potential through a resistor 43. The grid is returned to ground through a resistor 44 while the cathode is grounded directly. An output conductor 45 is connected to the anode. Tube 42 operates as a conventional clipper stage which does not amplify the negative portions of the voltage applied to its grid.

The invention has been described with respect to a preferred embodiment. However, many modifications may be made within the scope of the invention. For example, the pulses 29 and 36 may be either negative or positive, depending upon the portion of the circuit to which they are applied. The output conductor 25 may be coupled to the anode of either tube 11 or 12, depending upon the phase and polarity of the waveform desired. Any suitable method may be employed to render tube 31 normally nonconductive. Many other modifications will occur to those skilled in the art.

What is claimed is:

1. Apparatus for producing a train of voltage pulses of different widths having a constant repetition frequency comprising, a monostable multivibrator, said multivibrator comprising a first electron tube having a cathode, an anode, and a control electrode and a second electron tube having a cathode, an anode, and a control electrode, said second electron tube being normally conductive, a resistor, a direct current path including said resistor connecting the control electrode of said second electron tube to a source of positive potential, a source of voltage pulses for periodically rendering said second tube nonconductive, a third electron tube having an anode, a cathode, and a control electrode, means for connecting said anode of said third electron tube directly to said resistor, and means for rendering said third electron tube alternately conductive and nonconductive.

2. Apparatus for producing a train of voltage pulses of different widths having a constant repetition rate comprising, a monostable multivibrator, said multivibrator comprising a first electron tube having a cathode, an anode, and a control electrode and a second electron tube having a cathode, an anode, and a control electrode, said second electron tube being normally conductive, a resistor, a direct current path including said resistor connecting the control electrode of said second electron tube to a source of positive potential, a source of voltage pulses for periodically rendering said second tube nonconductive, a third electron tube having an anode, a cathode, and a control electrode, means for connecting said anode of said third electron tube directly to said resistor, means for rendering said third electron tube normally nonconductive, and means for rendering said third electron tube conductive periodically.

3. Apparatus for producing a group of narrow voltage pulses followed by a group of wide voltage pulses comprising, a monostable multivibrator, said multivibrator comprising a first electron tube having a cathode, an anode, and a control electrode and a second electron tube having a cathode, an anode, and a control electrode, said second electron tube being normally conductive, a resistor a direct current path including said resistor connecting the control electrode of said second electron tube to a source of positive potential, a first source of voltage pulses connected to said multivibrator for periodically cutting off said second electron tube, a third electron tube having an anode, a cathode, and a control electrode, means for connecting said anode of said third electron tube directly to said resistor, means for rendering said third electron tube normally nonconductive, and a second source of voltage pulses for causing said third electron tube to conduct periodically.

4. Apparatus for producing a group of narrow voltage pulses followed by a group of wide voltage pulses comprising, a monostable multivibrator, said multivibrator comprising a first electron tube having a cathode, an anode, and a control electrode and a second electron tube having a cathode, an anode, and a control electrode, said second electron tube being normally conductive, a resistor, a direct current path including said resistor connecting the control electrode of said second electron tube to a source of positive potential, a first source of voltage pulses connected to said multivibrator for periodically cutting off said second electron tube, thereby establishing the frequency of said multivibrator, a third electron tube having an anode, a cathode, and a control electrode, means for connecting said anode of said third electron tube directly to said resistor, means for rendering said third electron tube normally nonconductive, a second source of voltage pulses in which the duration of each pulse is long compared to the period of said multivibrator, and means for connecting said second source of voltage pulses to said third electron tube for causing said third electron tube to conduct periodically.

5. Apparatus according to claim 4 further comprising means for differentiating the pulses from said second source before application to said third electron tube.

6. In a monostable multivibrator including first and second electron tubes each including a cathode, an anode and a control electrode and including a first resistor connected between a source of positive potential and said anode of said first electron tube and including a second resistor connected between a source of positive potential and said anode of said second electron tube and including means for coupling said control electrode of said first electron tube to said anode of said second electron tube and including means for coupling said control electrode of said second electron tube to said anode of said first electron tube and in which said second electron tube is normally conductive and including a direct current path including a third resistor connected between a source of positive potential and said control electrode of said second electron tube, apparatus for periodically increasing the periods of nonconduction of said second normally conductive electron tube comprising, a third electron tube having an anode, a cathode and a control electrode and receiving its anode potential through said third resistor, and means for periodically rendering said third electron tube conductive.

7. In a monostable multivibrator including first and second electron tubes each including a cathode, an anode and a control electrode and including a first resistor connected between a source of positive potential and said anode of said first electron tube and including a second resistor connected between a source of positive potential and said anode of said second electron tube and including means for coupling said control electrode of said first electron tube to said anode of said second electron tube and including means for coupling said control electrode of said second electron tube to said anode of said first electron tube and in which said second electron tube is normally conductive and including a direct current path including a third resistor connected between a source of positive potential and said control electrode of said second electron tube, apparatus for periodically increasing the periods of nonconduction of said second normally conductive electron tube comprising, a third electron tube having an anode, a cathode and a control electrode and receiving its anode potential through said third resistor, means for rendering said third electron tube normally nonconductive, and means for periodically rendering said third electron tube conductive.

8. In a monostable multivibrator including first and second electron tubes each including a cathode, an anode and a control electrode and including a first resistor connected between a source of positive potential and said anode of said first electron tube and including a second resistor connected between a source of positive potential and said anode of said second electron tube and including means for coupling said control electrode of said first electron tube to said anode of said second electron tube and including means for coupling said control electrode of said second electron tube to said anode of said first electron tube and in which said second electron tube is normally conductive and including a direct current path including a third resistor connected between a source of positive potential and said control electrode of said second electron tube, apparatus for increasing the length of selected pulses appearing in the anode circuits of said electron tubes, comprising a third electron tube having a cathode, an anode and a control electrode and receiving its anode potential through said third resistor, means for rendering said third electron tube normally nonconductive, and a source of voltage pulses for rendering said third electron tube conductive periodically.

References Cited in the file of this patent

UNITED STATES PATENTS

| | | | |
|---|---|---|---|
| 2,405,237 | Ruhlig | Aug. 6, | 1946 |
| 2,418,268 | Lawson | Apr. 1, | 1947 |
| 2,429,500 | Wolfner | Oct. 21, | 1947 |
| 2,432,204 | Miller | Dec. 9, | 1947 |
| 2,438,638 | Lakatos | Mar. 30, | 1948 |
| 2,438,950 | Smith | Apr. 6, | 1948 |
| 2,515,271 | Smith et al. | July 18, | 1950 |
| 2,540,551 | Shenk | Feb. 6, | 1951 |
| 2,559,499 | Gillette | July 3, | 1951 |
| 2,589,465 | Weiner | Mar. 18, | 1952 |
| 2,596,956 | Nierman | May 13, | 1952 |
| 2,724,017 | Heeren et al. | Nov. 15, | 1955 |